United States Patent
Aoki et al.

(10) Patent No.: US 7,995,872 B2
(45) Date of Patent: Aug. 9, 2011

(54) OPTICAL MODULATOR COMPONENT AND OPTICAL MODULATOR

(75) Inventors: Kenji Aoki, Nagoya (JP); Osamu Mitomi, Sagamihara (JP); Jungo Kondo, Nishikamo-Gun (JP); Yuichi Iwata, Nagoyai (JP); Tetsuya Ejiri, Kasugai (JP)

(73) Assignee: NGK Insulators, Ltd., Aichi-Prefecture (JP)

( * ) Notice: Subject to any disclaimer, the term of this patent is extended or adjusted under 35 U.S.C. 154(b) by 54 days.

(21) Appl. No.: 12/499,921

(22) Filed: Jul. 9, 2009

(65) Prior Publication Data
US 2009/0274408 A1 Nov. 5, 2009

Related U.S. Application Data

(63) Continuation of application No. PCT/JP2008/052604, filed on Feb. 12, 2008.

(30) Foreign Application Priority Data

Feb. 14, 2007 (JP) .................. 2007-033317

(51) Int. Cl.
*G02F 1/035* (2006.01)
*G02B 6/12* (2006.01)
*G02B 6/26* (2006.01)

(52) U.S. Cl. .................. 385/2; 385/14; 385/45
(58) Field of Classification Search .................. 385/1–3, 385/45
See application file for complete search history.

(56) References Cited

U.S. PATENT DOCUMENTS

| | | | | |
|---|---|---|---|---|
| 5,729,642 | A | * | 3/1998 | Thaniyavarn .................. 385/17 |
| 5,802,222 | A | * | 9/1998 | Rasch et al. .................. 385/1 |
| 7,778,497 | B2 | * | 8/2010 | Mitomi et al. .................. 385/2 |
| 2003/0138180 | A1 | | 7/2003 | Kondo et al. |
| 2004/0240765 | A1 | * | 12/2004 | Wooten et al. .................. 385/2 |
| 2004/0264832 | A1 | | 12/2004 | Kondo et al. |
| 2005/0213863 | A1 | * | 9/2005 | Sugiyama et al. .................. 385/2 |
| 2005/0271313 | A1 | * | 12/2005 | Oikawa et al. .................. 385/3 |
| 2006/0056002 | A1 | * | 3/2006 | Wooten et al. .................. 359/245 |

(Continued)

FOREIGN PATENT DOCUMENTS
GB 2327773 A 2/1999
(Continued)

OTHER PUBLICATIONS

Takashi Yamada et al., "*Highly Functional Hybrid Modules Using Low Loss Direct Attachment Technique with Planar Lightwave Circuit and LiNbO₃ Devices,*" 10th International Symposium on Microwave and Optical Technology, 2005, pp. 107-110.

(Continued)

*Primary Examiner* — Michelle R Connelly Cushwa
(74) *Attorney, Agent, or Firm* — Cermak Nakajima LLP; Tomoko Nakajima

(57) ABSTRACT

An optical modulator component 2 has a substrate 4 for modulation made of an electro-optical material and having a joining face 4b; an optical waveguide 6 provided in or on the substrate 4 and having at least one pair of branched portions 6c; and a radio-frequency interaction portion 11 applying a voltage on the respective branched portions 6c to modulate light propagating through the branched portions. The optical waveguide 6 has end faces 15A, 15B, 15C and 15D present on the joining face 4b of the substrate 4 for modulation.

10 Claims, 12 Drawing Sheets

U.S. PATENT DOCUMENTS

| | | |
|---|---|---|
| 2006/0274991 A1 | 12/2006 | Kawano et al. |
| 2008/0025662 A1 | 1/2008 | Kondo et al. |
| 2009/0232439 A1* | 9/2009 | Mitomi et al. .................... 385/2 |

FOREIGN PATENT DOCUMENTS

| | | |
|---|---|---|
| JP | 04-355714 A1 | 12/1992 |
| JP | 09-015545 A | 1/1997 |
| JP | 11-030722 A1 | 2/1999 |
| JP | 11-119042 A | 4/1999 |
| JP | 2003-057459 A | 2/2003 |
| JP | 2003-121806 A | 4/2003 |
| JP | 2003-215519 A | 7/2003 |
| JP | 2004-245991 A1 | 9/2004 |
| JP | 2005-173162 A1 | 6/2005 |
| JP | 2005-241768 A1 | 9/2005 |
| JP | 2006-047956 A1 | 2/2006 |
| WO | WO2006090863 A1 | 8/2008 |

OTHER PUBLICATIONS

U.S. Appl. No. 12/401,753, filed Mar. 11, 2009, Mitomi et al.
U.S. Appl. No. 12/407,904, filed Mar. 20, 2009, Hamajima et al.

* cited by examiner

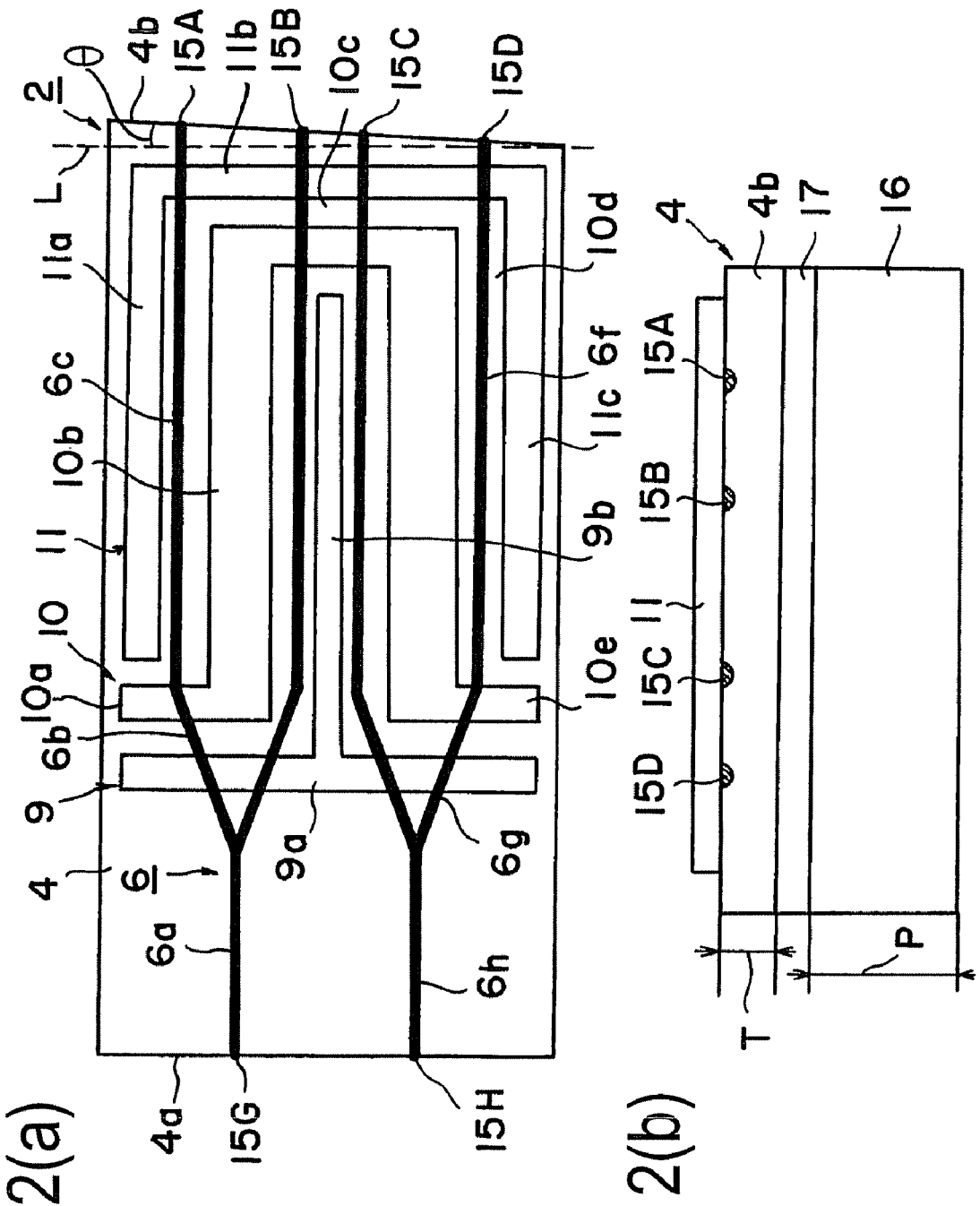

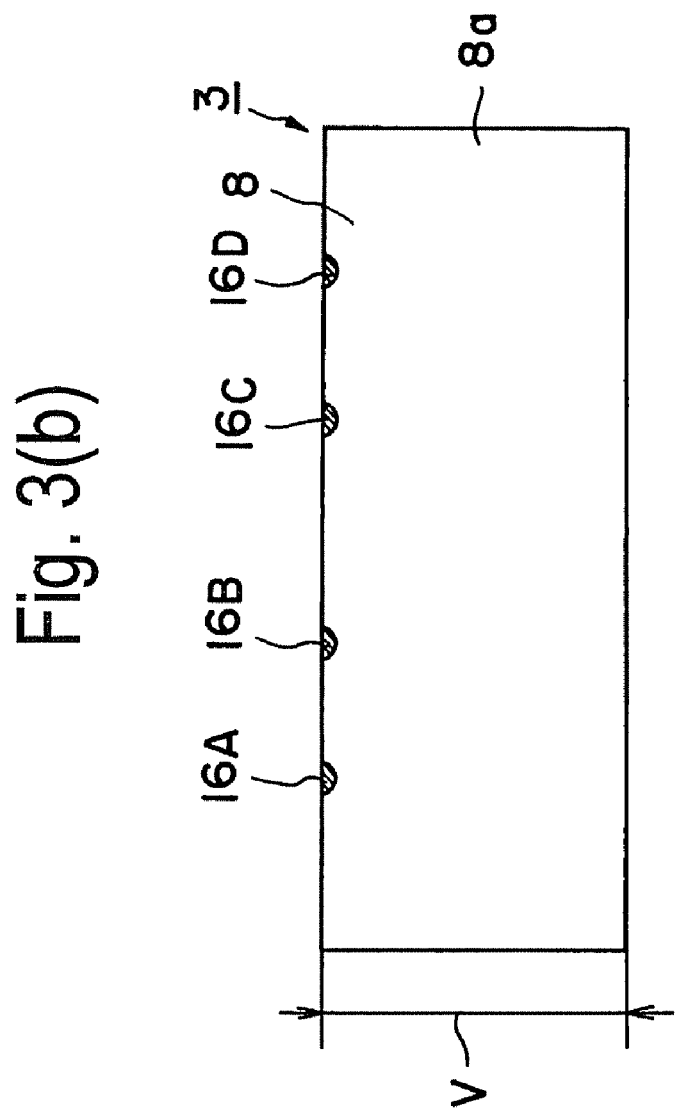
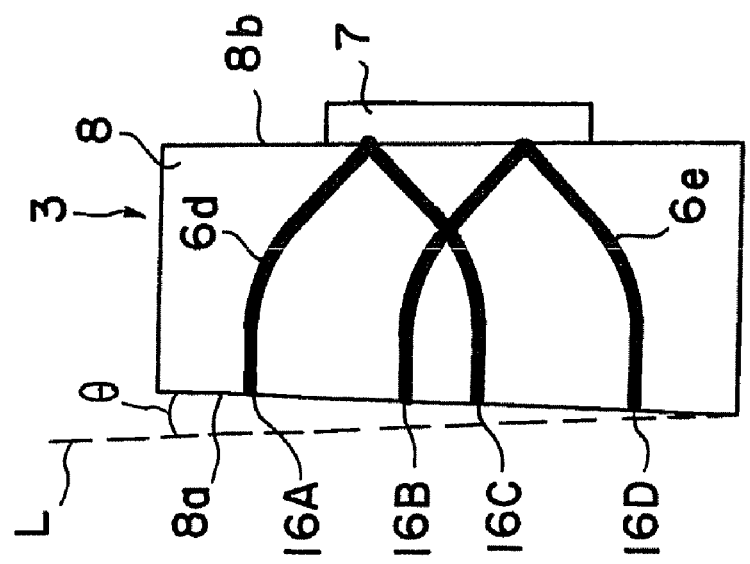

OPTICAL MODULATOR COMPONENT AND OPTICAL MODULATOR

TECHNICAL FIELD

The present invention relates to a component for an optical modulator such as a traveling-wave type optical modulator.

BACKGROUND ART

According to Japanese Patent Publication No. H4-355714A, an optical waveguide of an optical control element is turned back at an end face of a substrate, thereby extending an interaction length between a lightwave and a modulating wave, decreasing a drive voltage, compensating a matching velocity difference between the lightwave and a signal wave, and realizing a high-speed operation.

According to "Highly Functional Hybrid Modules Using Low Loss Direct Attachment Technique with Planar Lightwave Circuit and LiNbO$_3$ Devices", T. Yamada et al., ISMOT-2005, pp. 107-110, 2005, a planar optical circuit (PLC) and an LN waveguide device are connected to each other. Moreover, Japanese Patent Publication No. 2005-173162A describes a connection between a PLC and an LN waveguide, and, on this occasion, there is a difference between mode field diameters of the optical waveguides on two substrates therefore, and there is thus provided a tapered portion for adjusting the difference in the mode filed diameter.

It should be noted that Japanese Patent Publication No. 2004-245991A describes a structure of using adhered fixtures at both chip ends.

DISCLOSURE OF THE INVENTION

In an optical modulator requiring a complex optical waveguide structure such as the SSB modulator and the DQPSK modulator, an interaction portion is large and long, resulting in an increase in size of the modulator. It is possible to produce a large modulator chip using a ferroelectric single crystal wafer with a large diameter. However, it is hard to produce an evenly thinned piece from the ferroelectric single crystal wafer with a large diameter such as a lithium-niobate single crystal wafer, and expensive facilities are necessary for processing the single crystal wafer with a large diameter. Therefore, it has been hard to produce a modulator chip at a low cost.

Japanese Patent Publication No. H4-355714A proposes a configuration of shortening the modulator by folding back the optical waveguide. However, even with this configuration, a modulator chip is fairly long for an optical modulator having the complex structure, and the solution thus is necessary.

Though "Highly Functional Hybrid Modules Using Low Loss Direct Attachment Technique with Planar Lightwave Circuit and LiNbO$_3$ Devices", T. Yamada et al., ISMOT-2005, pp. 107-110, 2005, and Japanese Patent Publication No. 2005-173162A describe methods for joining two different types of optical waveguide substrates to each other, there are problems in reliability and characteristics of the devices such as difference in coefficient of line thermal expansion between both of the substrates.

Moreover, it is necessary to narrow an electrode gap in order to reduce a drive voltage in the radio-frequency interaction portion of the optical modulator. On the other hand, in order to narrow the electrode gap and simultaneously maintain the characteristic impedance matching thereby attaining a lightwave-microwave velocity matching, it is necessary to reduce the thickness of the modulator substrate to 5 μm or less.

If a titanium diffusion optical waveguide, for example, is formed on this very thin lithium-niobate substrate, the mode size in the direction of the thickness of the substrate (vertical direction) is restricted by the substrate thickness, resulting in a shape wide in the horizontal direction. On the other hand, the mode field diameter of an optical fiber to be connected is approximately 10 μm of a circle. As a result, if the optical waveguide formed on the thin lithium-niobate substrate is connected to an external optical fiber, an insertion loss increases.

An object of the present invention is, in an optical modulator including an interaction portion applying a voltage on light propagating through a branch-type optical waveguide to modulate the light, to reduce the size of a wafer necessary for producing the optical modulator, thereby reducing the manufacturing cost.

The present invention provides an optical modulator component comprising a substrate for modulation made of an electro-optical material and having a joining face, an optical waveguide provided in or on the substrate and including at least one pair of branched portions, and a radio-frequency interaction portion applying a voltage on the respective branched portions, thereby modulating light propagating through the branched portions, wherein end faces of the optical waveguide are present on the joining face of the substrate for modulation.

Moreover, the present invention provides an optical modulator comprising the modulator component and a passive component, wherein the passive component comprises a substrate for passive component and made of an electro-optical material, and an optical waveguide formed in or on the substrate for passive component and connected to the respective end faces of the optical waveguide of the modulator component, and wherein the substrate for modulation and the substrate for passive component are joined to each other.

Moreover, the present invention provides an optical modulator comprising the modulator component and a connection component for light propagating through an optical fiber, wherein the connection component comprises a substrate for connection component and made of an electro-optical material and an optical waveguide formed in or on the substrate for connection component and is connected to the respective end faces of the optical waveguide of the modulator component, and wherein the substrate for modulation and the substrate for connection component are joined to each other.

According to the present invention, in an optical modulator including an interaction portion electrically modulating light propagating through a branch-type optical waveguide, a portion on which the interaction portion is provided is separated as an independent component, and respective end faces of the optical waveguide are formed on a joining face of the modulator component, which occurred to the inventors. Then, it occurred to the inventors that, by independently providing a passive component, and joining the passive component to the modulator component, an end face of the optical waveguide of the interaction portion is connected to an end face of the optical waveguide of the passive type, thereby causing them to operate as an optical modulator. As a result, even if a structure of the optical waveguide and a structure of electrodes in the interaction portion are complex, the length of the component for optical modulator can be largely reduced. Further, the inventors have confirmed that, even if the passive component is independently provided, the optical loss at the attachment portion can be minimized, and have attained the present invention.

According to the present invention, the portion for carrying out the radio-frequency interaction and the optical connection portion for emitting and receiving light propagating through an optical fiber are formed by independent chips as described above. Then, the connection component connecting the light propagating through the optical fiber is made thicker than the substrate for modulator for carrying out the radio-frequency interaction. As a result, it is possible to reduce the insertion loss when the light propagating through the optical fiber is received to or emitted from the modulator. Moreover, the coupling loss caused by a conversion of spot size between the component for connection and the component for optical modulation is not so large.

According to "Highly Functional Hybrid Modules Using Low Loss Direct Attachment Technique with Planar Lightwave Circuit and LiNbO$_3$ Devices", T. Yamada et al., ISMOT-2005, pp. 107-110, 2005, and Japanese Patent Publication No. 2005-173162A, the two different types of optical waveguide substrates are joined, and this is carried out, by joining a lithium-niobate optical modulator and a silica-based planar lightwave circuit on a quartz glass substrate (PLC), for example, to manufacture an optical time division multiplexing module. However, the optical modulator and the PLC respectively carry out different functions, and it is not speculated that the optical modulator itself is divided into the active component (optical modulation operation unit) and the passive component.

BRIEF DESCRIPTION OF THE DRAWINGS

FIG. 2(a) is a plan view showing an optical modulator component 2, and FIG. 2(b) is a front view of the component 2;

FIG. 3(a) is a plan view showing a passive component 3, and FIG. 3(b) is a front view of the passive component 3;

BEST MODES FOR CARRYING OUT THE INVENTION

"Radio-frequency interaction portion" according to the present invention implies an area in which a radio-frequency voltage is applied on an optical waveguide, thereby modulating light. The radio frequency voltage herein implies a voltage at a frequency equal to or more than 1 GHz. The upper limit of this frequency is not specifically restricted.

A more detailed description will now be given of the present invention properly referring to drawings.

Figure 1:
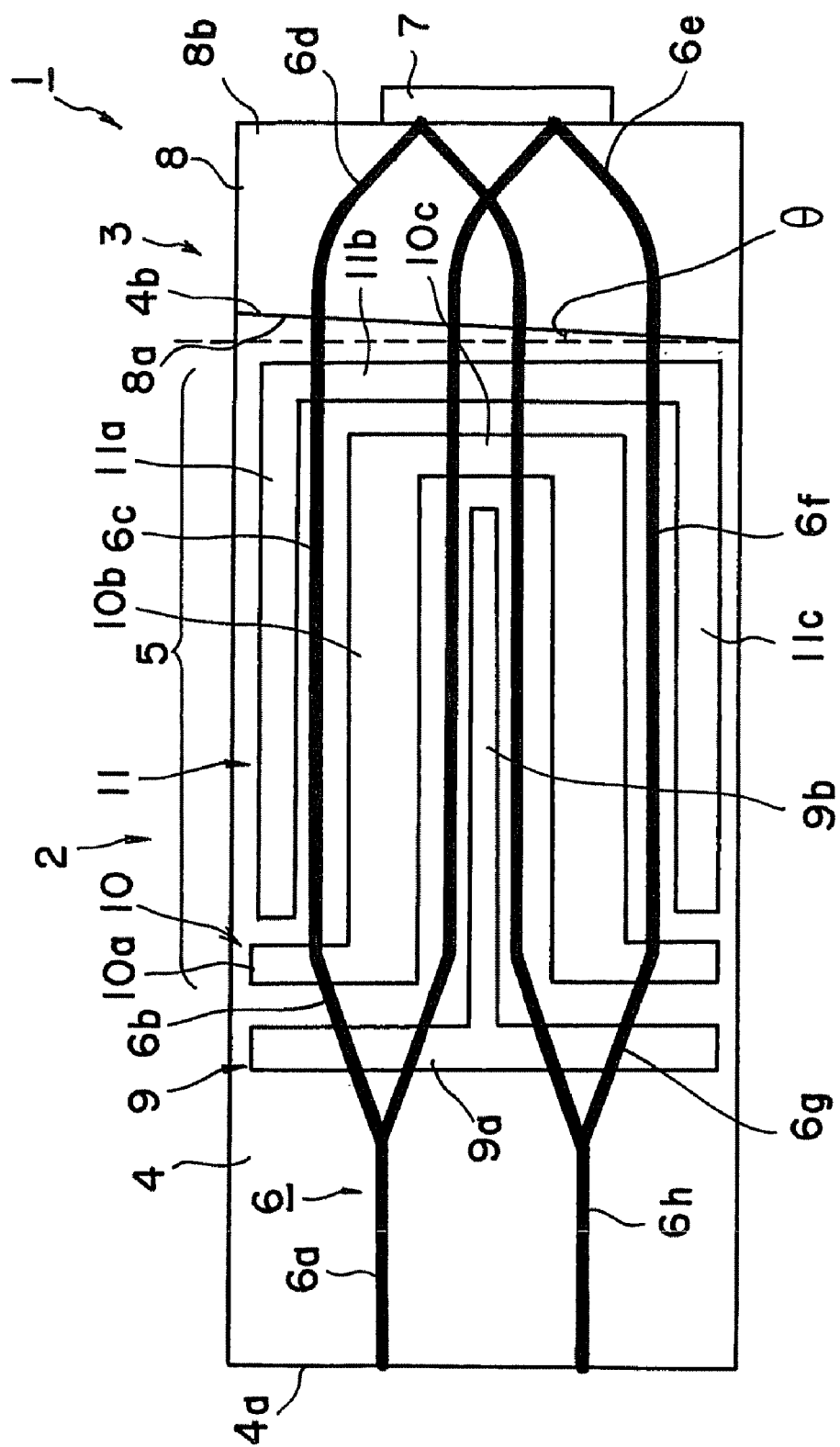
FIG. 1 is a plan view schematically showing an optical modulator 1 according to an embodiment of the present invention.
Figure 4:
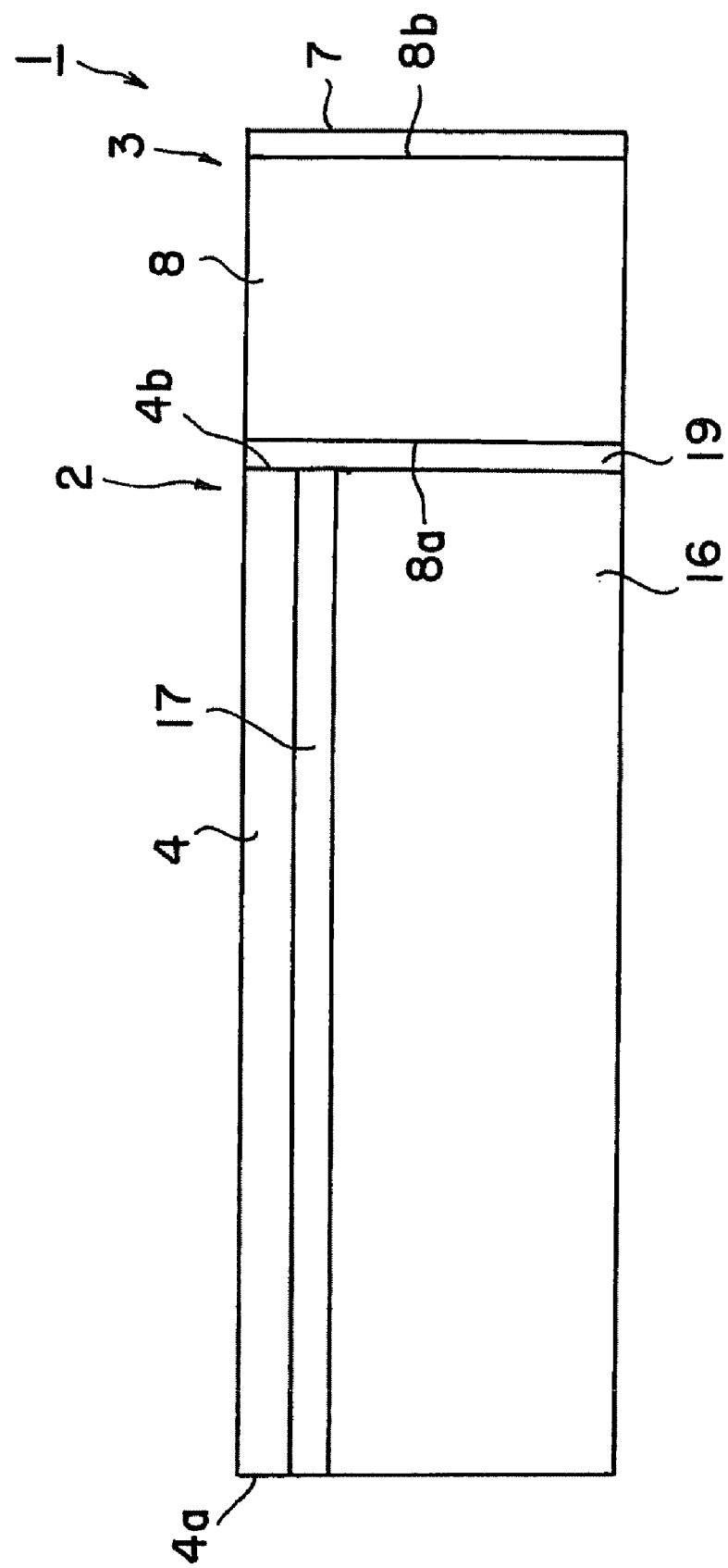
FIG. 4 is a side view of the optical modulator 1.

FIG. 1 is a plan view schematically showing an optical modulator 1 according to an embodiment of the present invention. FIG. 2(a) is a plan view showing a component for optical modulator 2, and FIG. 2(b) is a front view of the optical modulator component 2 taken in a direction from an end face side. FIG. 3(a) is a plan view showing a passive component 3, and FIG. 3(b) is a front view of the passive component 3 taken in a direction from an end face side. FIG. 4 is a side view showing the optical modulator 1.

The optical modulator component 2 shown in FIGS. 2(a) and 2(b) includes a substrate for modulator 4, a support base 16, and a low-dielectric-constant layer 17 for adhering both of them to each other. An optical waveguide 6 extends from an end face 4a to an end face 4b on the substrate for modulator 4. End faces 15G, 15H on the incident side of the optical waveguide are formed, and exposed on the end face 4a on an incident side. Moreover, end faces 15A, 15B, 15C, 15D of branched portions 6c, 6f of the optical waveguide are exposed on the end face 4b on an emission side of the component 2.

The passive component 3 in FIG. 3 includes a substrate 8. Optical waveguides 6d, 6e are formed on the surface side of the substrate 8. End faces 16A, 16B, 16C, 16D of the optical waveguides are formed on an joining face 8a of the substrate 8, and a reflection material 7 is formed on a terminal end face 8b of the substrate 8.

The optical modulator 1 in FIG. 1 is produced by joining the optical modulator component and the passive component to each other. For example, as shown in FIG. 4, the joining face 4b of the substrate 4 and a joining face of the support base 16 of the optical modulator component 2 are adhered to the joining face 8a of the substrate 8 of the passive component 3 through an adhesive layer 19.

As a result, the optical waveguide on the optical modulator component and the waveguides on the passive component are optically joined, resulting in the optical waveguide 6 as shown in FIG. 1. In this example, light made incident from an end portion 6a of the optical waveguide 6, branches at a branch point, and passes through the branched portions 6b, 6c. Then, the light passes through the end portions 6d, is reflected by the reflection material 7, and passes the end portions 6e, the branched portions 6f, 6g, and the emission portion 6h, and is emitted from the end face 4a. A voltage is applied on the propagating light in the branched portions 6c, 6f, thereby modulating the propagating light.

Though, in this example, the electrodes are configured as the so-called CPW (CoPlanar Waveguide) structure, the present invention is not limited to the optical modulator having the CPW structure, and can be applied to optical modulators in various forms. The present invention can be applied to an optical modulator of the so-called ACPS (Asymmetric CoPlanar Strip) type, or an optical modulator of the independent modulation type, for example.

In the optical modulator in FIG. 1, reference numerals 9, 11 denote ground electrodes, and reference numeral 10 denotes a signal electrode. In this example, the voltage is applied on the optical waveguide 6 at respective gaps between the ground electrodes 9, 11, and the signal electrode 10.

The inner ground electrode 9 includes a power supply portion 9a connected to a feed through, which is not shown, and a row of electrode portion 9b extending approximately parallel with a main portion. The outer ground electrode 11 includes a connection portion 11b striding over the optical waveguide, and electrode portions 11a, 11c extending parallel with branched portions 6c, 6f. The signal electrode 10 includes a pair of power supply portions 10a, electrode portions 10b extending from the respective power supply portions 10a in parallel with the respective branched portions 6c, 6f, and a connection portion 10c connecting the respective electrode portions 10b with each other.

Figure 5:
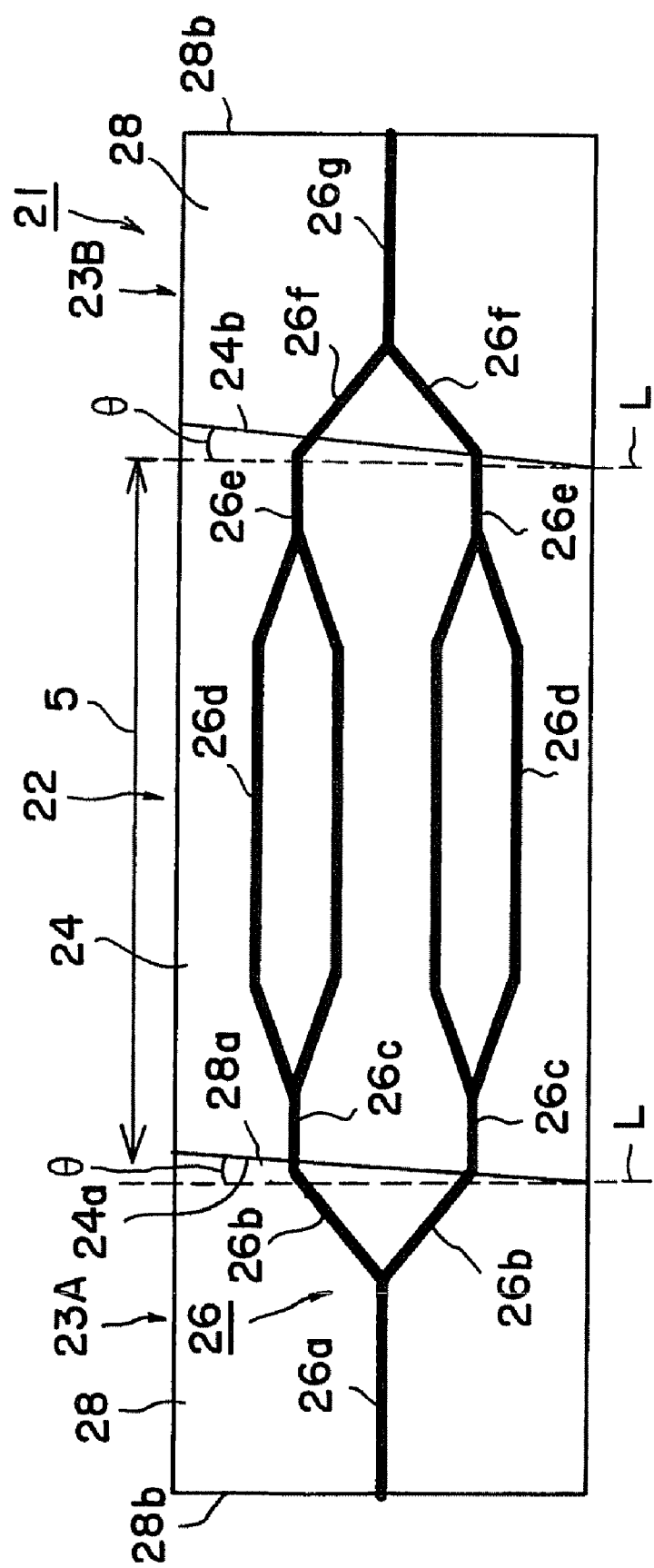
FIG. 5 is a plan view of an optical modulator 21 according to the present invention.
Figure 6:
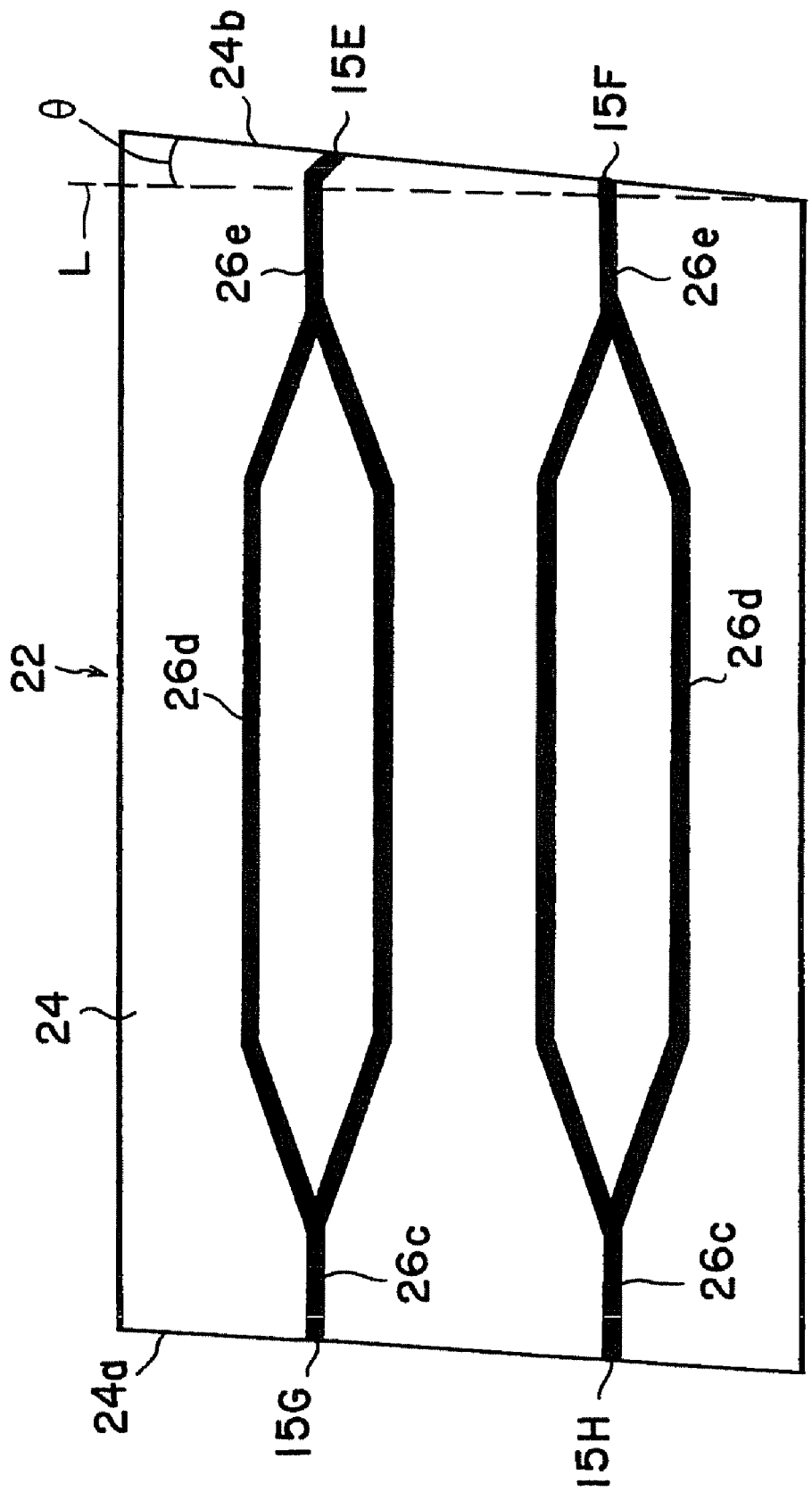
FIG. 6 is a plan view showing an optical modulator component 22.

FIG. 5 and FIG. 6 show an example of application of the present invention to a so-called SSB modulator. FIG. 5 is a plan view showing an optical modulator 21, and FIG. 6 is a plan view showing a component for optical modulator 22 according to the present invention.

The optical modulator component 22 shown in FIG. 6 includes a substrate 24 for modulator, the support base 16, and the low-dielectric-constant layer 17 for adhering both of them to each other. An optical waveguide 26 extends from an end face 24a to an end face 24b on the substrate for modulator 24. The end faces 15G, 15H of the optical waveguide are formed and exposed on the end face 24a of the component 22. Moreover, the end faces 15E, 15F of the optical waveguide are exposed on the end face 24b on the opposite side of the component 22. Primary branched portions 26c, secondary branched portions 26d, and primary branched portions 26e are successively formed from the end face 24a side.

Passive components 23A, 23B in FIG. 5 include substrates 28. On the passive component 23A, an incident portion 26a and primary branched portions 26b are formed on the substrate 28. On the passive component 23B, an emission portion 26g and primary branched portions 26f are formed on the substrate 28. A predetermined signal voltage is applied by proper ground electrode and signal electrode, thereby modulating light propagating through the branched portions 26d in the interaction portion 5.

The optical modulator 21 in FIG. 5 is produced by joining the passive components 23A, 23B respectively to both end faces of the optical modulator component 22. For example, as shown in FIG. 4, the joining face 24a, 24b of the substrate 24 and the joining face of the support base 16 of the component for optical modulator 22 are adhered to a joining face 28a of the substrates 28 of the passive components 23A, 23B through the adhesive layer 19.

In this example, light made incident from the end portion 26a of the optical waveguide 26, branches at a branch point, passes through the primary branched portions 26b, 26c, branches again, and is made incident to the secondary branched portions 26d. Then, the light is modulated in the branched portions 26d. Then, the light in the branched portions 26d is multiplexed, passes through the primary branched portions 26e, 26f, and is further multiplexed, passes through the emission portion 26g, and is emitted to the outside of the modulator.

In the above-described respective examples, the respective end faces of the respective branched portions of the optical waveguide are exposed on the joining faces of the substrate for modulator of the optical modulator component. In this way, the end faces of the branched portions of the optical waveguide are preferably exposed on the joining faces. However, what are exposed on the joining faces of the substrate for modulator is not limited to the end faces of the branched portions of the optical waveguide.

Figure 7:
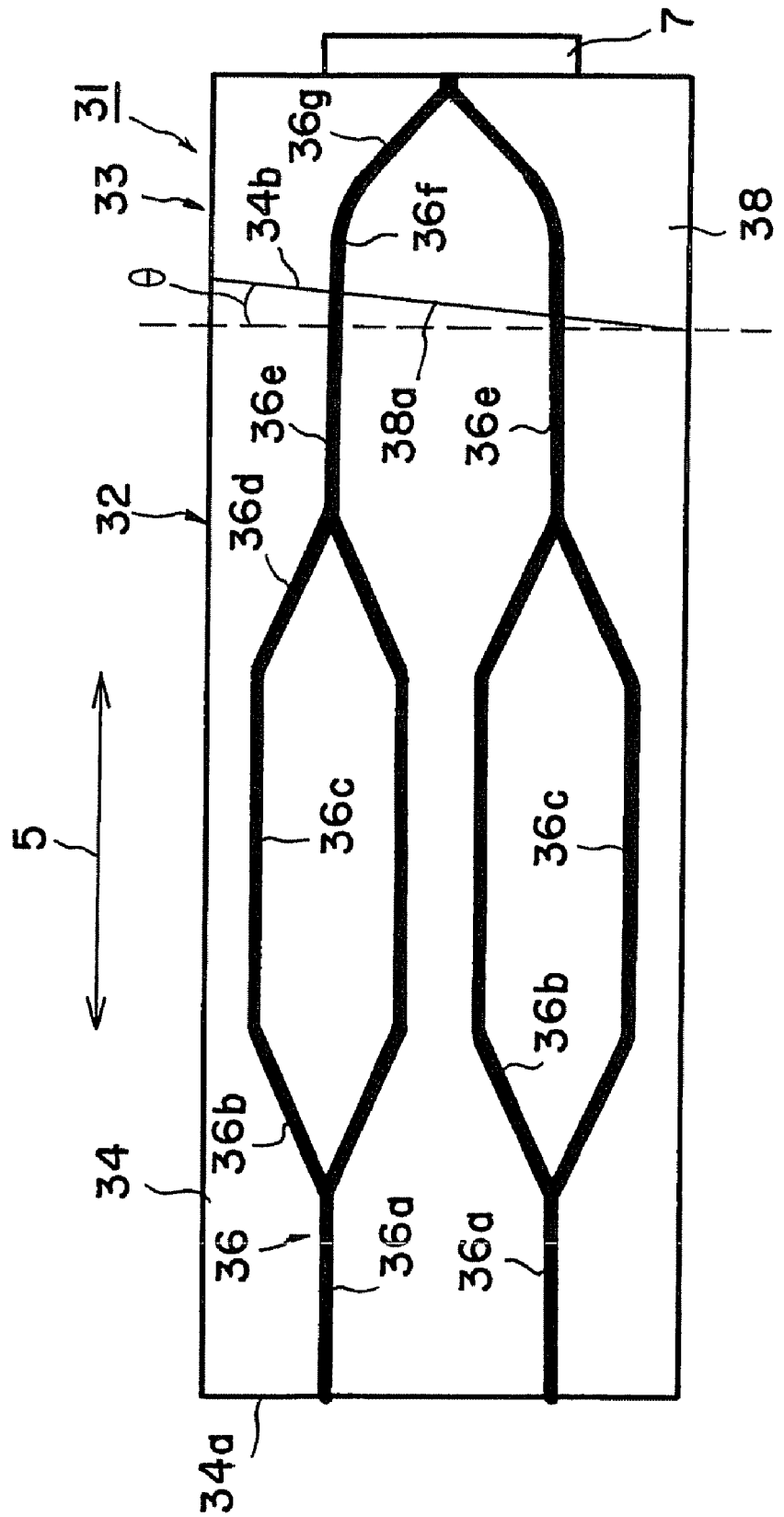
FIG. 7 is a plan view showing an optical modulator 31 according to the present invention.
Figure 8:
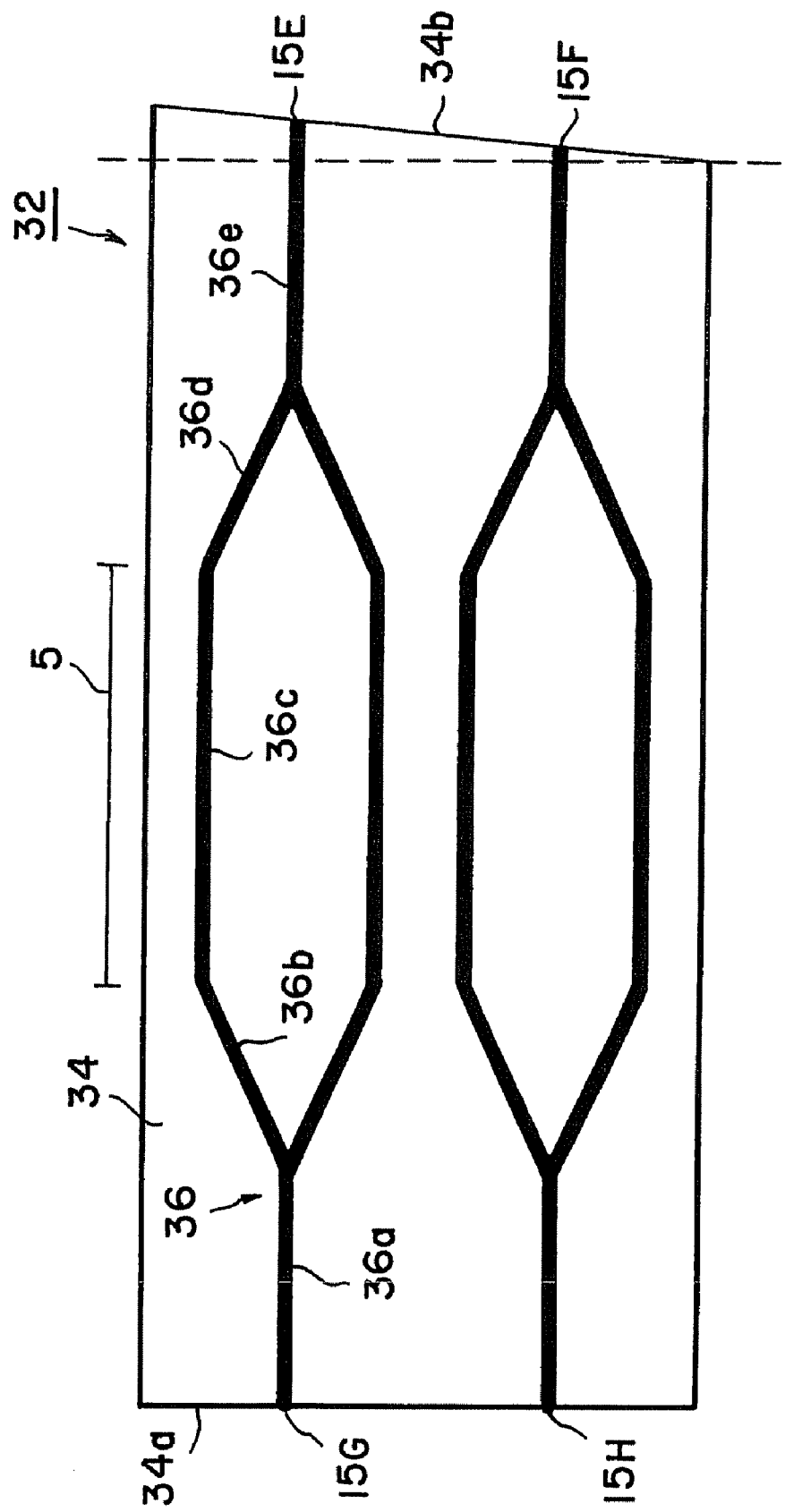
FIG. 8 is a plan view showing an optical modulator component 32.

FIG. 7 and FIG. 8 show an example of application of the present invention to a so-called CSRZ modulator. FIG. 7 is a plan view showing an optical modulator 31, and FIG. 8 is a plan view showing an optical modulator component 32 according to the present invention.

The optical modulator component 32 shown in FIG. 8 includes a substrate 34 for modulator, the support base 16, and the low-dielectric-constant layer 17 for adhering both of them to each other. An optical waveguide 36 extends from an end face 34a to a joining face 34b on the substrate for modulator 34. The end faces 15G, 15H of the optical waveguide are formed and exposed on the end face 34a of the component 32. Moreover, the end faces 15E, 15F of the optical waveguide are exposed on the end face 34b on the opposite side of the component 32.

A passive component 33 in FIG. 7 includes a substrate 38. A waveguide portion 36f and a reflection portion 36g are formed on the substrate 38. Moreover, the reflection material 7 is formed on a terminal end face of the component 33.

The optical modulator 31 in FIG. 7 is produced by joining the passive component 33 to the end face 34b of the optical modulator component 32. For example, as shown in FIG. 4, the joining face 34b of the substrate 34 and the joining face of the support base 16 of the optical modulator component 32 are adhered to a joining face 38a of the substrate 38 of the passive component 33 through the adhesive layer 19.

In this example, light made incident from an end portion 36a of the optical waveguide 36 branches at a branch point, passes through branched portions 36b, and is modulated in the branched portions 36c. Then, the light from the branched portions 36d is multiplexed, and passes through waveguide portions 36e, 36f, passes through a reflection portion 36g, and is reflected by the reflection material 7. Then, the light passes through the reflection portion 36g, waveguide portions 36f, 36e, branches, and is modulated in the modulation portions 36c by predetermined modulation. Then, the light passes through the branched portions 36b, is multiplexed, and is emitted from the waveguide portion 36a.

A description will now be given of an embodiment in which the present invention is applied to a combination of a connection component for light propagating through an optical fiber and a component for radio-frequency modulation. FIGS. 9 to 12 relate to the present embodiment.

Figure 9:
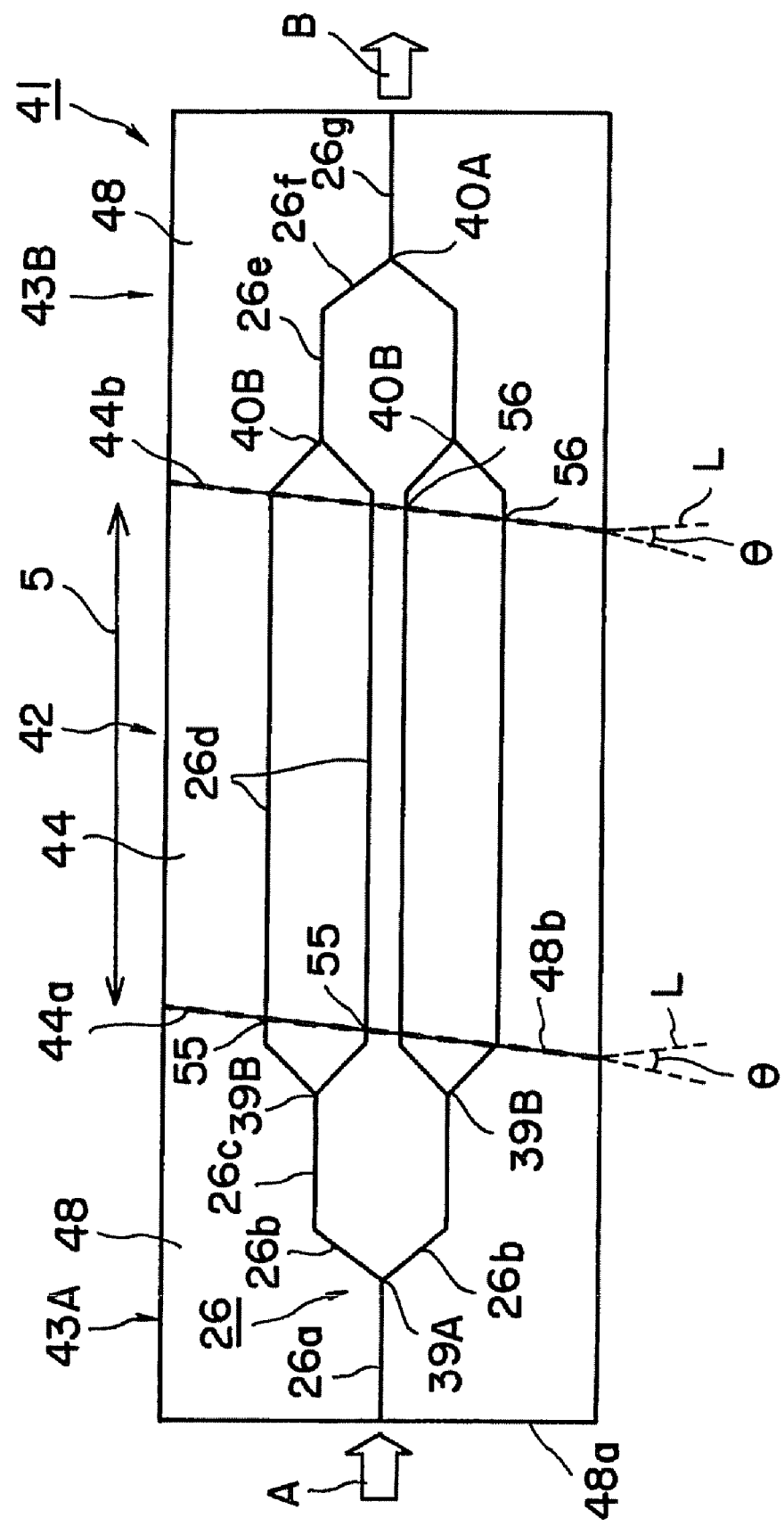
FIG. 9 is a plan view of an optical modulator 41 according to the present invention.
Figure 10:
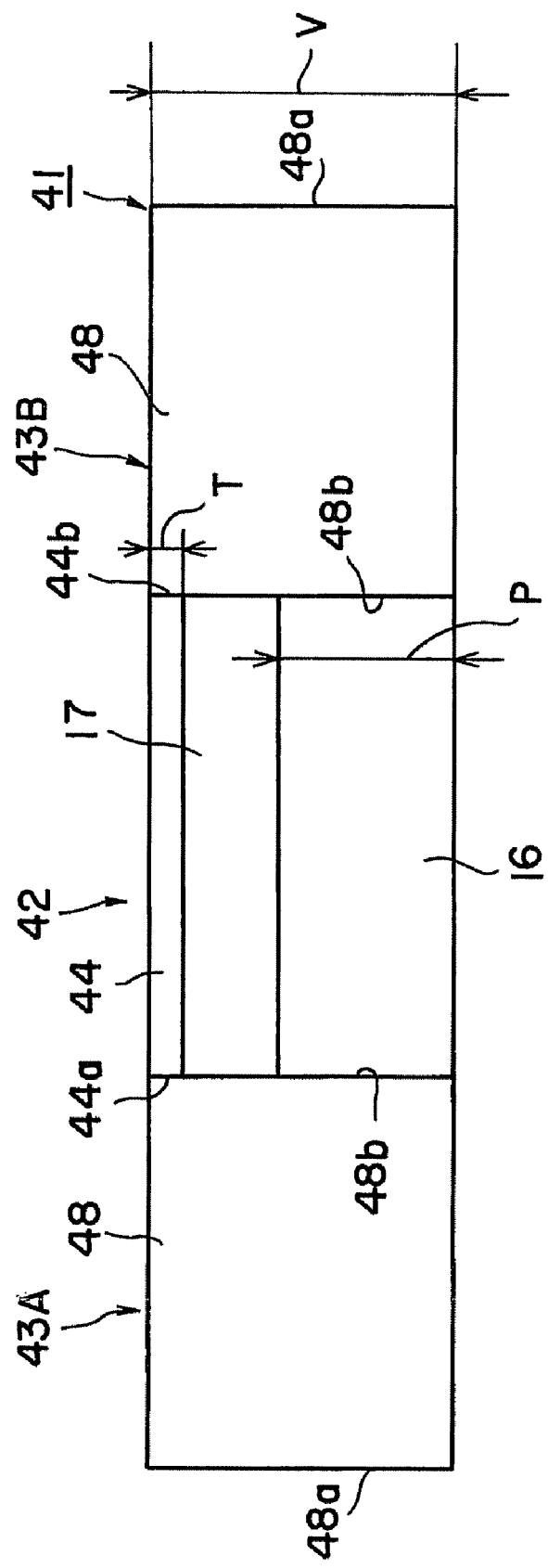
FIG. 10 is a side view of the optical modulator 41 in FIG. 9.

FIG. 9, FIG. 10, as FIG. 5 and FIG. 6, show an example of application of the present invention to an SSB modulator.

FIG. 9 is a plan view showing an optical modulator 41, and FIG. 10 is a side view showing the optical modulator 41 according to the present invention.

The optical modulator component 42 includes a substrate for modulator 44, the support base 16, and the low-dielectric-constant layer 17 for adhering both of them to each other. Optical waveguides 26d extend from an end face 44a to an end face 44b on the substrate 44 for modulator. End faces 55 of the optical waveguide are formed and exposed on the end face 44a of the component 42. Moreover, end faces 56 of the optical waveguide are exposed on the end face 44b on the opposite side of the component 42. A total of four secondary branched portions 26d, for example, are formed between the end faces 44a and 44b.

The connection components 43A, 43B in FIG. 9 respectively include substrates 48. The incident portion 26a, the primary branched portions 26b, 26c, and terminal ends of secondary branched portions are formed on the substrate 48 on the connection component 43A on the light incident side. The emission portion 26g, the primary branched portions 26e, 26f, and terminal ends of secondary branched portions are formed on the substrate 48 on the connection component 43B on the light emission side.

The optical modulator 41 in FIG. 10 is produced by joining the connection components 43A, 43B respectively to both the end faces of the optical modulator component 42. For example, the joining faces 44a, 44b of the substrate 44 and the joining face of the support base 16 of the optical modulator component 42 can be adhered, through an adhesion layer, not shown, to joining faces 48b of the substrate 48 of the respective connection components 43A, 43B.

In this example, light propagating through the optical fiber made incident from the end portion 26a of the optical waveguide 26 as an arrow A shows, branches at a multiplexing portion 39A, passes through the primary branched portions 26b, 26c, branches again at demultiplexing portions 39B, and is made incident to the secondary branched portions 26d. Then, the light is modulated in the branched portions 26d. Then, the light from the branched portions 26d is multiplexed in multiplexing portions 40B, passes through the primary branched portions 26e, and is further multiplexed in a multiplexing portion 40A, passes through the emission portion 26g, and is emitted to the outside of the modulator as an arrow B shows.

It should be noted that, in this example, both the incident light indicated by the arrow A and the emitted light indicated by the arrow B are light propagating through the optical fiber.

Moreover, both in the light incident portion and the light emission portion, an optical fiber can be directly connected to the connection components 43A, 43B in a form of pigtail connection. Alternatively, an optical fiber can be connected to the optical waveguide of the respective connection components through a lens coupling. In either case, the light propagating through the optical fiber is connected to the connection component.

Figure 11:
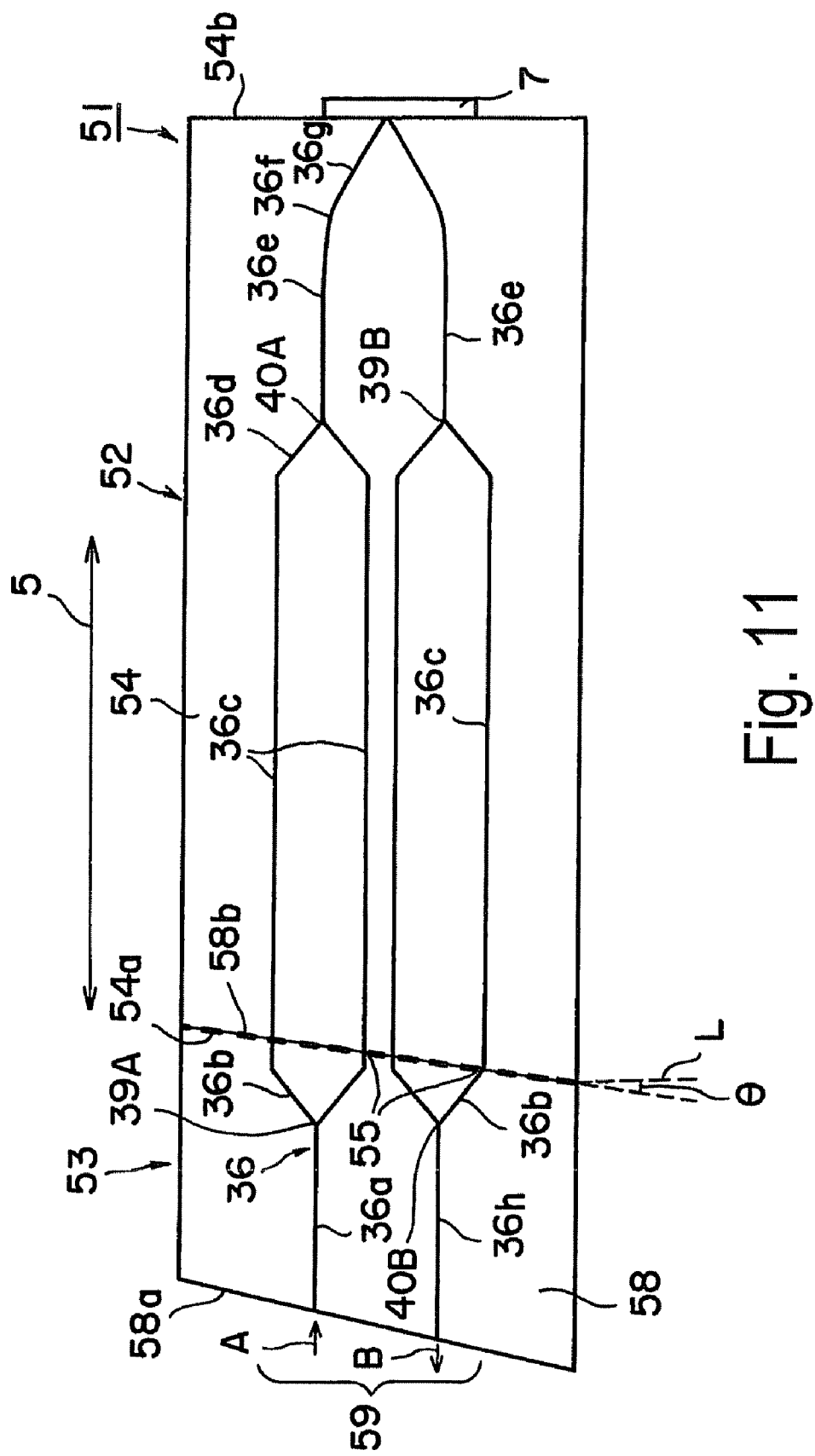
FIG. 11 is a plan view of an optical modulator 51 according to the present invention.
Figure 12:
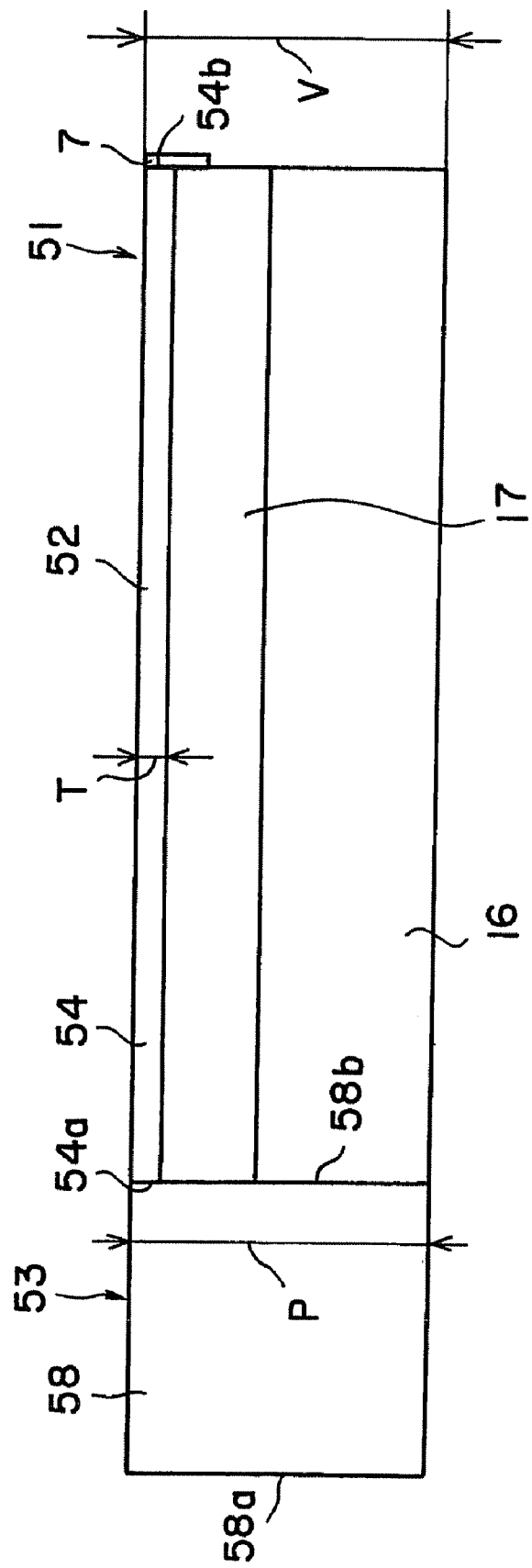
FIG. 12 is a side view of the optical modulator 51 in FIG. 11.

FIG. 11 and FIG. 12 show an example of application of the present invention to a so-called CSRZ modulator. FIG. 11 is a plan view showing an optical modulator 51, and FIG. 12 is a side view showing the optical modulator 51.

The optical modulator component 52 includes a substrate 54 for modulator, the support base 16, and the low-dielectric-constant layer 17 for adhering both of them to each other. The optical waveguide 36 extends from a joining face 54a to an end face 54b on the substrate for modulator 54. Specifically, four rows of the primary branched portions 36c, 36d, the multiplexing portion 40A, the demultiplexing portion 39B, the waveguide portions 36e, 36f, and the reflection portion 36g are provided. The end faces 55 of the optical waveguide are formed and exposed on the joining face 54a of the component 52. Moreover, the reflection material 7 is formed on the end face 54b of the component 52.

A connection component 53 includes a substrate 58. The incident portion 36a, the emission portion 36h, the demultiplexing portion 39A, the multiplexing portion 40B, and the primary branched portions 36b are formed on the substrate 58.

The optical modulator 51 is produced by joining the connection component 53 to the joining face 54a of the optical modulator component 52. For example, as shown in FIG. 12, the joining face 54a of the substrate 54 and the joining face of the support base 16 of the optical modulator 52 component are adhered to a joining face 58b of the substrate 58 of the connection component 53 through an adhesive layer, not shown.

In this example, light made incident from the incident portion 36a of the optical waveguide 36 branches at the demultiplexing portion 39A, and passes through branched portions 36b, and is modulated at the branched portions 36c. Then, light from the branched portions 36d is multiplexed in the multiplexing portion 40A, and passes through the waveguide portions 36e, 36f, passes through the reflection portion 36g, and is reflected by the reflection material 7. Then, the light passes through the reflection portion 36g, the waveguide portion 36e, is demultiplexed in the demultiplexing portion 39B, and is modulated in the modulation portions 36c by predetermined modulation. Then, the light passes through the branched portions 36b, is multiplexed by the multiplexing portion 40B, and is emitted from the emission portion 36h.

It is possible to provide an electrode for adjusting the phase which shifts a bias point in the substrate for optical modulation or the substrate for connection. The electrode for adjusting the phase is an electrode for driving to adjust the DC bias point. The frequency of the drive voltage is 1 kHz to 400 MHz, for example.

Moreover, the multiplexing portion and the demultiplexing portion can be provided in the optical waveguide as the examples described above. In this case, the multiplexing portion and the demultiplexing portion may be provided in or on the substrate for optical modulation or in or on the substrate for connection. If the multiplexing portion and demultiplexing portion are provided on the substrate for connection, since the substrate for connection is thicker, the propagating light can be advantageously easily made into single-mode propagation.

The optical waveguide may be a ridge-type optical waveguide directly formed on one main surface of the substrate for modulator, the substrate for passive component or the substrate for connection, a ridge-type optical waveguide formed, through another layer, on one main surface of the respective substrates, and an optical waveguide formed inside the respective substrates by an internal diffusion method or an ion exchange method such as titanium diffused optical waveguide, and a proton exchange optical waveguide. Specifically, the optical waveguide may be a ridge-type optical waveguide in which an optical waveguide protrudes from the surface of the substrate. The ridge-type optical waveguide can be formed by laser processing and machining. Alternatively, a high refraction factor film is formed on a substrate, and a ridge-type three-dimensional optical waveguide can be formed by machining or applying laser-ablation processing to the high refractive index film. The high refractive index film may be formed by chemical vapor deposition, physical vapor deposition, organic metal chemical vapor deposition, sputtering, and liquid phase epitaxial, for example.

In the above respective examples, though the electrodes are provided on the surface of the substrate for modulator, the electrodes may be directly formed on the surface of the substrate for modulator, or may be formed on the low-dielectric-constant layer or a buffer layer. Publicly known materials such as silicon oxide, magnesium fluoride, silicon nitride, and alumina may be used for the low-dielectric-constant layer. The low-dielectric-constant layer herein refers to a layer made of material with a dielectric constant lower than the dielectric constant of the material forming the main body of the substrate.

The material forming the substrate for modulator, the substrate for passive component and the substrate for connection is a ferroelectric electro-optical material, preferably a single crystal. The crystal is not specifically limited as long as it can modulate light, and, lithium niobate, lithium tantalate, lithium niobate-lithium tantalite solid solution, potassium lithium niobate, KTP, GaAs and quartz can be examples thereof.

A material of the support base may be, in addition to the above-described ferroelectric electro-optical materials, glass such as quartz glass.

Moreover, in a preferred embodiment, the substrate for modulator and the substrate for passive component (or the substrate for connection) are made of the same type of material. In this case, the same type of material implies materials having the same basic components, and may be doped or not. Joining the substrate for optical modulation and the substrate for passive component (or the substrate for connection) made of the same type of material in this way is unnatural, and is not assumed in Japanese Patent Publication No. 2005-173162A, which assumes joining different types of functional components made of different materials.

The adhesive adhering the substrate for modulator and the support base to each other is made of a material having lower dielectric constant than the substrate for modulator. As specific examples of which are not specifically limited as long as they satisfy the above-described conditions, epoxy adhesives, thermosetting adhesives, ultraviolet curing adhesives, Aron Ceramics C (name of a product from Toagosei Co., Ltd.) (coefficient of thermal expansion: $13 \times 10^{-6}$/K) are examples thereof.

The method for joining the substrate for modulator and the substrate for passive component (or the substrate for connection) to each other is not specifically limited, and there are following examples. An optical aligning machine which can move at a precision of submicron can be used to attach the substrate for modulator and the substrate for passive component (or the substrate for connection) to each other. The substrate for modulator and the substrate for passive component (or the substrate for connection) are respectively fixed to dedicated jigs of the optical aligning machine. First, optical axis of the optical waveguide 36a on the substrate for modulator and an optical fiber are aligned to a position which maximizes the optical power emitted from the optical waveguide 36e. Then, the optical waveguide 36f of the substrate for passive component (or the substrate for connection) and the optical waveguide 36e of the substrate for modulator are aligned. Then, both of them are joined to each other using a UV curing resin.

Though a tilt between the chips may not be adjusted by an attachment precision of the dedicated jigs of the aligning machine, the tilt may be adjusted by alignment by tilting of the aligning machine when a high precision is required. A mortise structure may be provided on the joining faces between the substrate for modulator and the substrate for passive component (or the substrate for connection) and the joining faces to an optical fiber. In this case, it is possible to restrain the optical output from fluctuating due to a change in an environmental temperature. This structure of using adhered fixtures at both chip ends is described in Japanese Patent Publication No. 2004-245991A, for example.

Especially, though there is no specific restriction on the adhesive when the substrate for modulator and the substrate for passive component are to be adhered to each other, epoxy adhesives, thermosetting adhesives, ultraviolet curing adhesives, Aron Ceramics C (name of a product from Toagosei Co., Ltd.) (coefficient of thermal expansion: $13 \times 10^{-6}$/K) are examples thereof.

Though, in the respective examples described above, the case in which the present invention is applied to the amplitude modulator is described, the present invention may be applied to a phase modulator having different arrangement of the optical waveguides.

In a preferred embodiment, in order to maintain a proper return loss, the joining faces 4b, 24a, 24b, 34b are tilted with respect to a plane L orthogonal to a traveling direction of the propagating light at the branched portions (refer to FIGS. 1 to 12). Though this tilt angle θ is not specifically limited, it is preferably equal to or more than 1° and equal to or less than 30° when the diameter of the spot size of the optical waveguide is 10 micron. The proper θ depends on the spot size of the optical waveguide to be connected, and, thus, when the spot size is larger, the proper θ is smaller than this, and when the spot size is smaller, the proper θ is larger than this.

In FIG. 1 and FIG. 2, though the tilt angle is provided with respect to the width direction of the chip, the tilt angle may be provided with respect to the thickness direction of the chip.

Moreover, the return loss may be improved by employing a anti-reflection coat on the end face, and it is thus possible to make θ to 0° while a proper return loss is maintained.

In a preferred embodiment, as shown in FIG. 4, FIG. 10, FIG. 12, for example, the substrate 8 for passive component (or the substrate for connection) is joined to the substrate for modulator 3, the low-dielectric-constant layer 17, and the support base 16. According to the embodiment, compared with a case in which an entire optical modulator is processed into a thin plate, it is possible to significantly reduce an area of a substrate processed into a thin plate, thereby further reducing the production cost.

In this respect, the thickness T of the substrate for modulator (refer to FIG. 2(b), FIG. 10, FIG. 12) is preferably equal to or less than 20 μm, and is more preferably equal to or less than 10 μm. Moreover, the thickness V of the substrate for passive component (refer to FIG. 3(b), FIG. 10, FIG. 12) is preferably equal to or more than 100 μm, and more preferably equal to or more than 200 μm. Though the thickness P of the support base (refer to FIG. 2(b), FIG. 10, FIG. 12) is not specifically limited, in terms of handling of the component, the thickness P is preferably equal to or more than 100 μm, more preferably 500 μm or more.

Moreover, when the respective optical waveguides on the substrate for modulator, on the substrate for passive component, and on the substrate for connection are titanium diffusion optical waveguides, single-mode light can be obtained by reducing the thickness of a titanium layer for forming the optical waveguide on the substrate for modulator, thereby reducing the light confinement in the interaction portion. As a result, optical extinction ratio increases. Further, a loss by emission of the light in bent portions can be reduced by increasing the thickness of the titanium layer for forming the optical waveguides on the substrate for passive component (or the substrate for connection), thereby increasing the light confinement in the bent portions in the optical waveguides.

Examples

The optical modulator 1 shown in FIG. 1 and FIG. 4 was manufactured.

In particular, an X-cut three-inch wafer (LiNbO$_3$ single crystal) was used, and a Mach-Zehnder optical waveguide was formed on the wafer by the titanium diffusion process and the photolithography. The size of the optical waveguide can be 10 μm for 1/e$^2$, for example. Then, the signal electrode 10 and the ground electrodes 9, 11 were formed by a plating process.

Then, a grinding dummy substrate was fixed to a grinding surface plate, and a main body of the substrate for modulator was joined while the electrode surface was facing down. Then, the substrate 4 for modulator was processed into a thin plate down to a thickness of 7.5 μm by a horizontal grinding, lapping, and polishing (CMP). Then, the substrate 4 was fixed to the support base 16 in a plate shape. A resin for adhering and fixing has a resin thickness of 50 μm. The end face (connection portion to an optical fiber) of the optical waveguide was ground by end face grinding, and respective chips were obtained by cutting the wafer by means of dicing. The width of the chip was 2 mm, and the total thickness of the device was 0.5 mm.

In order to restrain the reflected returning light at the attachment portion of the substrate for RF modulation, the end face is tilted by an angle of 6°. The chip joining face was processed by oblique grinding for end face, and then, an AR coat film 7 was formed by vapor deposition.

On the other hand, an X-cut three-inch wafer (LiNbO$_3$ single crystal) was used, and a Mach-Zehnder optical waveguide was formed on the wafer by the titanium diffusion process and the photolithography. The size of the optical waveguide can be 10 μm for 1/e$^2$, for example. Then, the wafer was processed thereby obtaining the passive component. The width of the passive component was 2 mm, and the total thickness of the device was 0.5 mm. The joining face of the passive component was tilted by an angle of 6°. Then, an AR coat was applied to the joining face. Both of the substrates were aligned by observing guided light in the optical waveguide, and joined by an ultraviolet curing resin, thereby obtaining the modulator shown in FIG. 1 and FIG. 4.

The gaps between the signal electrode and ground electrodes were 21.5 μm. The thickness of the electrodes was 20 μm. The curvature radius of respective curved portions was 15 mm, and the full angle at turn-back portions was 10°.

The measured excess loss at the chip attachment portion of the joined optical waveguide was 0.2 dB. Moreover, it was confirmed that the return loss of the incident light was sufficiently maintained, and did not influence a light source. Microwave characteristics of the RF electrodes 9, 10, 11 formed on the RF modulation portion 5 were measured by a network analyzer, and it was confirmed that a −6 dB bandwidth of S21 of equal to or higher than 25 GHz was maintained, and modulation could be possible at 40 Gb/s.

Though the specific embodiments of the present invention have been described, the present invention is not limited to these specific embodiments, and may be changed and modified in various ways without departing from the scope of claims.

The invention claimed is:

1. An optical modulator comprising:
an optical modulator component comprising:
a substrate for modulation made of an electro-optical material and having a joining face and a bottom face;
an optical waveguide provided in or on the substrate and comprising at least one pair of branched portions;
a radio-frequency interaction portion applying a voltage on the respective branched portions to modulate light propagating through the branched portions;
a support base having an upper face; and
an adhesive layer adhering the upper face of the support base and the bottom face of the substrate for modulation to each other,
wherein the optical waveguide comprises end faces present on the joining face of the substrate for modulation; and
a passive component comprising:
a substrate made of an electro-optical material and having a joining face, and
an optical waveguide formed in or on the substrate for the passive component, wherein the optical waveguide comprises end faces present on the joining face of the substrate for the passive component,
wherein the end faces of the optical waveguide of the passive component is optically connected to the respective end faces of the optical waveguide of the optical modulator component; and
wherein the joining face of the substrate for the passive component is joined to the joining face of the substrate for the optical modulator component, the adhesive layer and the support base.

2. The optical modulator of claim 1, wherein the radio-frequency interaction portion comprises a signal electrode and a ground electrode for applying the voltage on the branched portion.

3. The optical modulator of claim 1, wherein the joining face of the substrate for modulation is inclined with respect to a plane perpendicular to a travel direction of the propagating light in the branched portion.

4. The optical modulator of claim 1, wherein the substrate for the optical modulator component and the substrate for the passive component are made of a same kind of material.

5. The optical modulator of claim 4, wherein the optical waveguide of the passive component comprises a folding-back portion.

6. The optical modulator of claim 1, wherein the optical waveguide of the passive component comprises a folding-back portion.

7. The component of claim 1, wherein the radio-frequency interaction portion comprises a signal electrode and a ground electrode for applying the voltage on the branched portion.

8. An optical modulator comprising:
an optical modulator component comprising:
a substrate for modulation made of an electro-optical material and having a joining face and a bottom face;
an optical waveguide provided in or on the substrate and comprising at least one pair of branched portions;
a radio-frequency interaction portion applying a voltage on the respective branched portions to modulate light propagating through the branched portions;
a support base having an upper face; and
an adhesive layer adhering the upper face of the support base and the bottom face of the substrate for modulation to each other,
wherein the optical waveguide comprises end faces present on the joining face of the substrate for modulation; and
a connection component for light propagating through an optical fiber, the connection component comprising:
a substrate made of an electro-optical material having a joining face; and
an optical waveguide formed in or on the substrate for the connection component, wherein the optical waveguide comprises end faces present on the joining face of the substrate for the connection component,
wherein the end faces of the optical waveguide of the connection component is optically connected to the respective end faces of the optical waveguide of the optical modulator component; and
wherein the joining face of the substrate for the connection component is joined to the joining face of the substrate for the optical modulator component, the adhesive layer and the support base.

9. The optical modulator of claim 8, wherein the substrate for the optical modulator component and the substrate for the connection component are made of a same kind of material.

10. The optical modulator of claim 8, wherein the optical waveguide of the connection component comprises a multiplexing portion or a demultiplexing portion.

* * * * *